Patented Nov. 25, 1952

2,619,423

UNITED STATES PATENT OFFICE 2,619,423

POWDERED TOPPING AND METHOD OF MAKING THE SAME

Holton W. Diamond, Whiting, Ind.

No Drawing. Application March 23, 1950, Serial No. 151,545

3 Claims. (Cl. 99—144)

This invention relates to a food product and method of making the same and more particularly to a food product in the class of whippable toppings. It relates more particularly to a whippable topping in powdered form adapted to be reconstituted with water to form an emulsion having predictable, controllable, and uniform whipping characteristics. It relates still further to a powdered topping adapted to be reconstituted and whipped in the same operation without aging of the reconstituted liquid emulsion.

The reduction of high-fat emulsions of the oil-in-water type, such as cream, to a dry, free-flowing powdered form by spray drying is conventional. In the spray drying of such emulsions, the suspended globules of fat are enveloped in surrounding envelopes of non-fat solids as the water evaporates from that portion of the aqueous phase in which the individual globule is suspended, and the dissolved solids of the aqueous phase are thereby deposited on the exterior of the fat globule. In an article published in The Journal of Dairy Science for July 1948, pp. 539 to 550, Pyenson and Tracy describe the spray drying of 30% cream, with sugar and stabilizer added.

Prior to the present invention, whippable toppings of this type which have been dried were subject to considerable variation in whipping performance. The experience of buying cream which fails to whip is so common as to be known to every housewife. Furthermore, it has been necessary in the past to "age" reconstituted dried whippable toppings before whipping them. (Ibid., p. 540, lines 12 and 13.)

In general, the prior art which relates to the preparation and treatment of whippable emulsions teaches the use of various homogenization procedures and many different emulsifying and stabilizing agents to improve the performance of the raw materials offered by nature to obtain better whipping characteristics in the finished product. The prior art does not disclose an understanding of the true nature of the physicochemical phenomena involved in the whipping and aeration of whippable food emulsions, nor how to control these phenomena with predictable certainty.

It is accordingly, an object of this invention to produce a powdered whippable topping having predictable, controllable and uniform whipping characteristics and in which each ingredient performs a definite and highly specific function, which function is subject to laboratory control.

Another object of this invention is to produce a powdered topping which can be reconstituted and whipped in the same operation, without aging of the reconstituted liquid emulsion.

A further object of this invention is to produce a nutritious powdered topping of high quality which can be manufactured at relatively low cost.

Other objects of the invention will appear in the following description and appended claims. Before explaining the present invention in detail, it is to be understood that the invention is capable of other embodiments and of being practiced or carried out in various ways. It is also to be understood that the phraseology or terminology employed herein is for the purpose of description and not of limitation.

I have discovered that a whipped topping can be produced with predictable and controllable performance characteristics by effecting a controlled reversal of the phases of the emulsion during aeration and whipping of the emulsion. In this process of phase reversal, an internal lattice of cohering solid fat globules is formed in the emulsion, which aids in the entrapment of air ingested by the proteinaceous, foam-forming components of the emulsion during the whipping of the mix.

I have also discovered a broad principle in emulsion technology; viz., that a deliberate and precisely controlled reversal of phases can be brought about in an emulsion by the use of specific and definite amounts of lipophilic additive or stabilizer comprising the mixed partial glyceride reaction product of the metathetical reaction of glycerin and whole edible fats or oils when this reagent is used in the definite amounts and ranges and mixed in a manner to give a desired state of equilibrium and ranges hereinafter specified and claimed. The stabilizer and the melted fat phase of the emulsion should be mixed before the two phases are dispersed by homogenization.

This invention is concerned not with this broad principle per se, but with its employment in a definite and specific application; viz. the production of a powdered whippable topping which can be reconstituted and whipped in the same operation, and which has predictable, controllable and uniform performance characteristics.

The following tables show the percentage range and specific percentages, respectively, for the various active ingredients of the powdered topping which will have the desired performance characteristics mentioned above:

Material: Per cent range

| Protein | 1.0–15.0 |
| Carbohydrate | 5.0–40.0 |
| Refined fat | 35.0–85.0 |
| Stabilizer | 0.3–20.0 |
| Water | 0.1–15.0 |

Material: Per cent preferred

| Protein | 2.6 |
| Carbohydrate | 27.0 |
| Refined fat | 64.4 |
| Stabilizer | 2.4 |
| Residual moisture | 1.0 |
| Flavoring substances | 2.6 |

In forming mixes in accordance with the concentrations given in the above table, there should exist a definite relationship between the concentration of the stabilizer relative to the concentration of the fat being employed. In manufacturing the powdered topping, the concentration of the stabilizer should be between 3.0 and 25.0% of the concentration of the pure, refined fat, particularly if the mix is likely to be kept on hand for a considerable period of time such as several days. However, where the topping is to be whipped and used within a relatively short period of time, the upper limit could be increased. Likewise, the lower limit may be reduced to approximately 1.0% but this reduction also effects a substantially proportionate reduction in the effectiveness of the stabilizer. It is preferred to use approximately 3.5% of the stabilizer relative to the weight of the fat.

The mixed partial glyceride product referred to can be either of two types, or a mixture of two types, the monoglyceride and the diglyceride. The monoglyceride may be represented by the type formula:

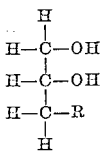

in which "R" represents one of a mixture of fatty acid residues derived from an edible oil or fat.

The diglyceride may be represented by the type formula:

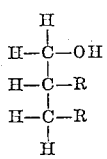

in which "R" represents one of a mixture of fatty acid residues derived from an edible oil or fat.

Partial glycerides, or synthetic fats, of these types, and the reactions by which they can be prepared are well known and described in organic chemistry. To illustrate, glycerin and fat can be made to react at two hundred forty degrees C. to two hundred fifty degrees C. (240–250° C.), with a fraction of one per cent of soap as a catalyst, and agitation to insure intimate contact of the reactants. The metathetical reaction is usually complete in fifteen minutes to thirty minutes. The molar proportions of glycerin to fat are two-to-one (2:1), one-to-one (1:1), or one-to-two (1:2), respectively, according to whether the monoglyceride, a mixture of the monoglyceride and the diglyceride, or the diglyceride is desired. A typical reaction of this type can be represented thus:

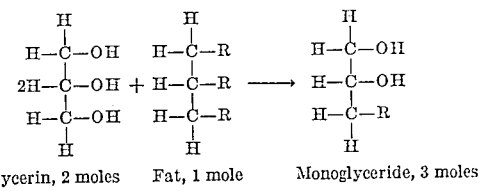

Glycerin, 2 moles   Fat, 1 mole   Monoglyceride, 3 moles

The mixed partial glyceride resultant can be deflavored for food use by the usual method of blowing steam through it under a vacuum.

Such a mixed partial glyceride product differs in chemical nature from an ordinary unmixed partial glyceride such as glyceryl monostearate, glyceryl dilaurate, or glyceryl monooleate in the diversity of its fatty acid groups. I have found, and it can readily be shown, that this mixed partial glyceride produces characteristics in a whippable food emulsion which cannot be obtained with any one of the single-ester partial glycerides, and that for the purpose of this invention, single-ester partial glycerides such as glyceryl monostearate, are not equivalent to the partial glyceride product described, made from glycerin and a whole edible oil or fat.

In achieving the objects of my invention, I employ this partial glyceride product, which may properly be termed a "lipophilic additive" first to produce a compound emulsion which is both of the oil-in-water type and of the water-in-oil type; and secondly, to bring about a reversal of phases in the emulsion during aeration and whipping.

An essential step in forming my emulsion is dissolving the lipophilic additive in the melted fat phase of the emulsion, before the two phases are dispersed by homogenization. Each globule of fat in the final emulsion thus has its quota of lipophilic additive dissolved in it. If the oil-soluble lipophilic additive is added to the emulsion after the phases have been dispersed, it has almost no phase-reversing effect.

A typical emulsion embodying my invention contains approximately thirty (30) per cent by weight of fat phase, and approximately seventy (70) per cent by weight of aqueous phase. As the emulsion emerges from the homogenizer, it is a simple oil-in-water emulsion. Immediately upon removal of agitation, however, as the emulsion is allowed to stand, either at room temperature or refrigerated at 30–40° F., the lipophilic additive or stabilizer begins to transform this simple emulsion into a compound emulsion of dual character, in which emulsions of both the oil-in-water type and the water-in-oil type are represented.

The molecular structure of the lipophilic additive is such that its micelle can be visualized as having at one end a large, fat-similar, lipophilic fragment, in which most of its molecular weight is concentrated, and a relatively smaller water-similar, or hydrophilic fragment containing the hydroxyl groups. A strong attraction of the fat globules for one another is brought about by the presence in the fat of the lipophilic additive. As the globules collide occasionally under the well known Brownian movement of small particles in suspension, they form spherical or near-spherical aggregates or enclosures, each aggregate having as its center a small portion of the aqueous phase of the emulsion, or of oil-in-water emulsion. As two or more of these cells or enclosures occasionally collide to form larger groups of such enclosures, it is seen that a compound emulsion is formed, predominantly of the oil-in-water type, but having within it small, discontinuous fragments of water-in-oil emulsion, represented by the minute enclosures and groups of enclosures, in which small portions of the aqueous phase are discontinuous and surrounded by cellular walls of cohering fat globules.

This process of formation of a compound emulsion is recognizable as the beginning of a phase reversal. The process proceeds more rapidly at room temperature than at refrigeration temperatures, as might be expected, and approaches an equilibrium as the groups of enclosures become larger and heavier and their movement is impeded by frictional forces, if the appropriate amount of lipophilic additive is used in formulating the emulsion. In the preparation of whippable food emulsions for use as liquid substitutes for whipping cream (cf. U. S. Patent No. 487,698 issued November 8, 1949), this near-equilibrium is reached after four to six hours at normal refrigeration (30–40° F.) temperatures and approximately one per cent of lipophilic additive. In practice, immediately after its preparation, the emulsion is allowed to stand quietly a few hours at refrigeration temperature, before delivery as a liquid whippable topping.

As this "aged" liquid emulsion is whipped, myriads of collisions are brought about among the free globules of fat, and the enclosures and the fragments of enclosures which have already been formed. The mechanical agitation thus disturbs the near-equilibrium which previously existed between the oil-in-water and the water-in-oil portions of the compound emulsion, and as the globules and cellular aggregates of the fat phase collide, the strong attractive influence of the lipophilic additive causes them to cohere, without, however, coalescing in such a way as to break the emulsion, and the phases of the emulsion are thus reversed, the relatively small amount of fat forming a gel or lattice structure, of solid, continuous phase, enclosing a much larger amount of aqueous phase, as a small amount of honeycomb holds a large amount of honey.

During the whipping, air is ingested, and the emulsion's lattice of fat globules is forced to form around bubbles of air. An analogy would be a honeycomb full of very large holes, or bubbles. This reversal of phases is for all practical purposes complete, and the whipped emulsion is of the water-in-oil type, reversed and "set up" around bubbles of air. Its aqueous phase is practically completely entrapped in the honeycomb cells of the lattice formed by the cohering globules of fat, and the walls of these cells are strengthened by the concentration, at their inner surface, of the somewhat elastic proteinaceous and other dissolved solids of the aqueous phase.

So powerful is the phase-reversing action of the lipophilic additive that when used in greater proportions, the resulting whippable emulsion does not require "aging," but can be whipped immediately after it reaches refrigeration temperature, at which temperature the fatty material of the emulsion hardens, and becomes capable of forming a supporting lattice. In other words, so far as aging of the emulsion is concerned, lipophilic additive can substitute for time.

A still larger proportion of lipophilic additive causes the reversal of phases in the emulsion to proceed without the aid of time or mechanical agitation, and the emulsion "jells" to a solid form as it cools.

In the emulsion of the present invention, I use a sufficient amount of the lipophilic additive to obtain an emulsion which, after being spray dried, can be reconstituted and immediately whipped without aging of the reconstituted liquid emulsion.

The word "stabilizer" has been given many definitions and usages. For example, the stabilizer of ice cream mix is generally gelatin, or a similar substance which thickens the mix. Gums are used in a similar way in certain emulsions to aid in maintaining the discontinuous phase in a dispersed condition. Various stabilizers are used in shortening to prevent the development of rancidity, and so on.

The lipophilic additive can be termed a stabilizer. When used in appropriate proportions, it stabilizes, holds and maintains a liquid whippable food emulsion in a compound form of dual character, in such a delicate state of equilibrium and readiness that a reversal of phases within the emulsion may be readily effected.

The term "near equilibrium," as used herein, means a condition of the emulsion in which the phases are present in both the oil-in-water type and the water-in-oil type and in which these phases are, for all practical purposes, in equilibrium. While the phases still tend to reverse, this reversal at relatively low temperatures is so slow that the composition will remain in this dual character for several days before a complete reversal results. Thus, the composition may remain on a store shelf or the like for relatively long periods and still maintain its dual character and also still be easily and quickly reversed by subsequent agitation. This very slow continuous reversal is due undoubtedly to the movement of the particles in accordance with the well known Brownian theory and is quickened substantially by either higher temperatures or by mechanical agitation since they both increase the movement of the particles.

The following example is given which illustrates the whippable topping of the present invention:

*Example I*

| | Per cent by weight |
|---|---|
| Neutral sodium proteinate of soy protein | 2.6 |
| Dextrose | 10.0 |
| Sucrose | 17.0 |
| Hydrogenated cottonseed oil | 64.4 |
| Stabilizer | 2.4 |
| Residual moisture | 1.0 |
| Flavoring substances | 2.6 |

In preparing a batch of a powdered topping embodying my invention, and particularly the composition of Example I, I measure into a stainless steel, steam jacketed agitator tank of one hundred gallons capacity, forty-five (45) gallons of water at sixty degrees centigrade. I then mix separately, in a dry powder mixer, eight (8) pounds of spray-dried neutral sodium proteinate of soy protein, forty (40) pounds of dextrose, seventy (70) pounds of sucrose, three pounds of salt, four ounces of colloidal tricalcium phosphate, and ten grams of a water-soluble vitamin mixture of powdered sugar, riboflavin, thiamine hydrochloride, and niacin. I add this dry mix to the hot water gradually with agitation, to complete the aqueous phase of my emulsion. I then discontinue agitation of the aqueous phase and add to the material in the agitator two hundred fifty (250) pounds of hydrogenated cottonseed oil, which is a solid at room temperature. Steam is admitted into the jacket in sufficient amounts to raise the temperature to the melting point of the vegetable fat which is thereby melted and forms a layer on top of the aqueous mixture in the tank. Into the fat layer I then add eight (8) pounds of the stabilizer or lipophilic additive described herein, comprising the melted partial glyceride reaction product of the metathetical reaction of glycerin and hydrogenated cottonseed oil. I also add into this fat layer six grams of U. S. Certified butter color, one-half (½) ounce of an oil-soluble concentrate of Vitamins A and D, and one-fourth (¼) ounce of an imitation cream flavor and stir without appreciable mixing of the fat and water layers in the tank. I then resume agitation of the mix, raise its temperature to seventy-five degrees centigrade, and homogenize the emulsion ingredients through a pressure-type, two-stage homogenizer at 2500 pounds per square inch at the first stage, and 500 pounds per square inch at the second stage. I then homogenize the mix a second time through the same machine, dispensing with the use of the first stage valve entirely, and adjusting the second stage valve so as to maintain an homogenization pressure of 250 pounds per square inch. I pump this hot emulsion immediately and directly to a spray drier, and there reduce it to dry powder form. I then package the dry powder preferably in fiber drums of one hundred (100) pounds capacity. Prior to use, the dry powder is reconstituted with water and whipped.

The original emulsion of the present invention can be prepared at temperatures above the melting point of the fat component, and below the temperature at which coagulation of the protein or degradation of other ingredients might occur. This temperature range varies somewhat with the ingredients used, but is generally between about fifty (50) degrees and eighty-five (85) degrees centigrade.

The original emulsion can be homogenized at a temperature within the general range described above, of fifty (50) degrees centigrade to eighty-five (85) centigrade. Low pressures of less than 500 pounds per square inch are suitable, but high homogenization pressures between about 2500 to 3500 pounds per square inch can be used to obtain very fine particle size and smooth texture in the finished emulsion, providing a second and final homogenization is effected at a pressure below 500 pounds per square inch. It has been shown that at high homogenization pressures, practically all the fat emerges from the homogenizer in the form of solid aggregates, or clumps, of fat globules. For the purpose of this invention, these clumps must be broken up by a second homogenization at lower pressure, or by some special device, to permit the globules of fat, under the influence of the lipophilic additive and the Brownian movement, to form the cellular enclosures herein described.

The function of the protein in the emulsion is that of a combined foaming and bodying agent, its concentration at the interface of the emulsion serving to strengthen the walls of the fat-globule lattice when the phases of the emulsion are reversed. An insufficient amount of protein gives inadequate support to the lattice walls of fat, permitting the whipped emulsion to "weep" excessively by collapse of the cells. An excess of proteinaceous materials in the emulsion has the effect of causing the emulsion to be excessively viscous and difficult to aerate, so that a whipped topping of insufficient "fluffiness" is obtained.

When using modified proteins, such as the product of enzymatic degradation of proteins, it is normally necessary to employ an additional thickening or bodying agent such as dextrins or soluble cellulose derivatives. In using such modified proteins, the concentration thereof may be reduced somewhat relative to the equivalent concentration of the neutral alkali proteinate. The lower limit of the latter compound should be approximately 0.7% of the total weight of the mix or emulsion whereas, in using the modified protein, the concentration may be reduced to approximately 0.1%.

For the purpose of my invention, neutral soy protein (sometimes known as neutral sodium proteinate of soy protein), neutral peanut protein, and in general, all other edible and neutral, water-soluble proteins of either animal or vegetable origin are suitable which are purified to the extent that they do not have associated with them contaminants which would interfere with their behavior in the emulsion. Skim milk, or skim milk powder can be used, since the foreign materials generally found associated with milk casein in this form do not interfere with its behavior in the emulsion.

Carbohydrates suitable for the purpose of my invention are dextrose, commercial glucose, corn syrup solids, sucrose, lactose, sorbitol, mannitol, and in general, all other edible, nutritious, water-soluble and neutral carbohydrate materials. The concentration of the carbohydrates in the mix is not critical in regard to the final characteristics in the emulsion, but merely varies the sweetness of the final product.

Fats suitable for the purpose of my invention are pure edible mixtures of complete glycerides, which are solid at room temperature, and which are free from modifying reagents often used in commercial shortenings, particularly of the "High Ratio" type, such as free fatty acids, lecithin, soap, polyglycerol esters, glyceryl esters, glycol esters, and synthetic blends of these and other modifying materials for the presence of such materials defeats the purpose of my invention. Fats that are suitable include pure hydrogenated vegetable oils, pure refined lard, and other refined fats. Butterfat is suitable if it is first subjected to the same refining and purifying processes as are applied to vegetable oils, although such a procedure is at present not economically feasible.

An important advantage of my invention is that it provides a powdered topping which has predictable, controllable, and uniform performance characteristics.

Another advantage of my invention is that it makes possible the utilization of nutritious, low cost food materials, such as vegetable proteins and fats, in a powdered topping which provides a whipped topping having body, texture, and stability equal to those of the most expensive toppings.

Another advantage of my invention is that it makes possible the preparation of a spray dried whippable topping which can be reconstituted and whipped in the same operation, without aging of the reconstituted liquid emulsion.

Having thus described my invention and how it is made, what I claim as new and desire to secure by United States Letters Patent is:

1. A powdered topping adapted to be reconstituted with water to incorporate and hold a predetermined quantity of air when whipped and comprising in approximate percentages by weight from 1.0% to 15.0% of edible, neutral water-soluble protein, from 5.0% to 40.0% of edible carbohydrate, from 35.0% to 85.0% of pure refined fat, and from 0.3% to 20.0% of a stabilizer comprising the mixed partial glyceride reaction product of the metathetical reaction of glycerin and a pure refined edible fat, and from 0.1% to 15.0% of residual moisture, in proportions one to another sufficient to make 100%, said topping, when reconstituted, being emulsified and being in near equilibrium between an oil-in-water type of emulsion and a water-in-oil type of emulsion.

2. A powdered topping in accordance with claim 1 and being further characterized in that the weight of said stabilizer is between about 3.0% and 25.0% of the weight of said pure refined fat.

3. A powdered topping adapted to be reconstituted with water to incorporate and hold a predetermined quantity of air when whipped and comprising 2.6% of neutral sodium proteinate of soy protein, 10.0% dextrose, 17.0% sucrose, 64.4% hydrogenated cottonseed oil, 2.4% of a stabilizer comprising the mixed partial glyceride reaction product of the metathetical reaction of glycerin and a pure refined edible fat, 1.0% moisture and 2.6% flavoring substances.

HOLTON W. DIAMOND.

REFERENCES CITED

The following references are of record in the file of this patent:

UNITED STATES PATENTS

| Number | Name | Date |
|---|---|---|
| 2,487,698 | Diamond | Nov. 8, 1949 |